(12) United States Patent
Song (10) Patent No.: US 12,483,164 B2
(45) Date of Patent: Nov. 25, 2025

(54) CIRCUIT SYSTEM FOR REGULATING DC FAN ROTATION SPEED DIGITALLY

(71) Applicant: Alpha Networks Inc., Hsinchu (TW)

(72) Inventor: Pengfei Song, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 290 days.

(21) Appl. No.: 18/126,406

(22) Filed: Mar. 25, 2023

(65) Prior Publication Data

US 2024/0186862 A1 Jun. 6, 2024

(30) Foreign Application Priority Data

Dec. 2, 2022 (CN) .......................... 202211540849.9

(51) Int. Cl.
*H02P 6/08* (2016.01)
*F04D 27/00* (2006.01)
*H02K 7/14* (2006.01)
*H02K 11/33* (2016.01)

(52) U.S. Cl.
CPC .............. *H02P 6/08* (2013.01); *F04D 27/004* (2013.01); *H02K 7/14* (2013.01); *H02K 11/33* (2016.01)

(58) Field of Classification Search
CPC .......... H02P 6/08; F04D 27/004; H02K 11/33
See application file for complete search history.

(56) References Cited

U.S. PATENT DOCUMENTS

| | | | |
|---|---|---|---|
| 3,860,861 A * | 1/1975 | Gucker | G05B 19/231 |
| 4,046,229 A | 9/1977 | Kernick | |
| 4,280,082 A * | 7/1981 | Acharya | H02P 7/2885 |
| | | | 388/933 |
| 4,573,787 A | 3/1986 | Sanbayashi | |
| 4,622,499 A * | 11/1986 | Squires | H02P 6/06 |
| | | | 318/400.04 |
| 4,891,645 A | 1/1990 | Lewis | |
| 4,952,834 A * | 8/1990 | Okada | H02N 2/147 |
| | | | 310/316.02 |
| 5,838,127 A | 11/1998 | Young | |
| 6,288,517 B1 | 9/2001 | Parker | |

(Continued)

FOREIGN PATENT DOCUMENTS

| | | |
|---|---|---|
| CN | 2328970 Y | 7/1999 |
| TW | I584563 B | 5/2017 |

*Primary Examiner* — Bickey Dhakal
(74) *Attorney, Agent, or Firm* — CIPO IP Group (57) ABSTRACT

A circuit system for digitally regulating direct-current fan rotation speed includes a parallel data generator circuit, a trapezoidal resistor network circuit, a current amplifier circuit, a linear voltage-controlled resistor circuit, and a fan power converter circuit. The parallel data generator circuit can receive control data and generate corresponding digital parallel data. The trapezoidal resistor network circuit can receive the parallel data and transfer it into a corresponding analog current signal. The current amplifier circuit can receive the current signal and convert it into a corresponding voltage signal. The linear voltage-controlled resistor circuit can receive the voltage signal and generate a corresponding resistance signal according thereto. The fan power converter circuit can adjust an output voltage according to the resistance signal, generate a corresponding drive voltage value, and transmit it to a fun motor of a direct-current fan so that the fan motor operates according to the drive voltage value.

10 Claims, 4 Drawing Sheets

(56) References Cited

U.S. PATENT DOCUMENTS

| 6,888,332 B2* | 5/2005 | Matsushita | G06F 1/206 |
| | | | 318/471 |
| 2010/0244764 A1* | 9/2010 | Schulter | H02P 7/28 |
| | | | 318/721 |

* cited by examiner

CIRCUIT SYSTEM FOR REGULATING DC FAN ROTATION SPEED DIGITALLY

CROSS-REFERENCE TO RELATED PATENT APPLICATION

This non-provisional application claims priority to and the benefit of, under 35 U.S.C. § 119(a), Chinese Patent Application No. 202211540849.9, filed Dec. 2, 2022 in People's Republic of China. The entire content of the above identified application is incorporated herein by reference.

FIELD

The present disclosure relates to a circuit system, and more particularly to a circuit system that can be applied to a direct-current (DC) fan and digitally adjust the speed of the DC fan.

BACKGROUND

Electronic equipment generally requires a heat dissipation fan for dissipating heat from the electronic equipment or the system in a forced manner, so as to prevent the equipment or system from being damaged by overheating. If, however, the rotation speed of the heat dissipation fan is not properly controlled such that the fan keeps rotating at full speed, the fan will make annoying high-decibel noise and increase system power consumption unnecessarily, which is environmentally unfriendly.

Heat dissipation fans for use in electronic equipment can be generally divided into pulse width modulation (PWM) fans and DC fans. The speed regulation circuit of a PWM fan provides PWM-based speed regulation while that of a DC fan provides step-down speed regulation. More specifically, the rotation speed of a PWM fan is regulated according to the duty ratio of the waveform of the inputted PWM signal, and this method is advantageous in that it allows speed regulation to be carried out digitally and in multiple stages (e.g., 256 or more stages). However, a PWM fan not only has a higher cost and requires a more complicated speed control circuit than a DC fan, but also calls for a dedicated speed control chip in order to produce the aforesaid advantages.

The rotation speed of a DC fan is regulated linearly according to the magnitude of the input voltage, and DC fans have a lower cost, are more easily available than PWM fans, and have been widely used in the industry. Common linear step-down regulation circuits for use with DC fans are relatively simple but have a great circuit loss, tending to cause unnecessary generation of heat in the systems using them. Moreover, a DC fan allows a relatively small number of stages (typically two to three stages) of rotation speed regulation and fails to satisfy the need for a finer division of rotation speeds and the requirement for low noise. One of the issues to be addressed in the present disclosure is to provide an effective solution to the foregoing inadequacies so as to combine the advantages of PWM fans and DC fans and eliminate the inadequacies of both.

SUMMARY

To achieve the design requirements for a low-cost multiple-stage low-noise heat dissipation system, in view of the inadequacies of the current PWM fans and DC fans, as a result of repeated research and tests, the present disclosure provides a circuit system for regulating DC fan rotation speed digitally, which combines the advantages of finer division of rotation speeds of PWM circuits and low cost of DC fans, so as to take into account both the cost and performance of a heat dissipation fan, to satisfy the industry needs, and to effectively answer current industry issues with the aid of the circuit system according to the present disclosure.

Certain aspects of the present disclosure are directed to a circuit system for digitally regulating DC fan rotation speed. The circuit system is applicable to a DC fan and includes a parallel data generator circuit, a trapezoidal resistor network circuit, a current amplifier circuit, a linear voltage-controlled resistor circuit and a fan power converter circuit. The parallel data generator circuit can receive a piece of control data outputted from a central processing unit (CPU) and generate a piece of digital parallel data corresponding to the control data. The trapezoidal resistor network circuit is electrically connected to the parallel data generator circuit and can receive the digital parallel data and transfer the digital parallel data into a corresponding analog current signal. The current amplifier circuit is electrically connected to the trapezoidal resistor network circuit and can receive the analog current signal and convert the analog current signal into a voltage signal. The linear voltage-controlled resistor circuit is electrically connected to the current amplifier circuit and can receive the voltage signal and generate a corresponding resistance signal according to the voltage signal. The fan power converter circuit can be electrically connected to a fan motor of the DC fan, receive the resistance signal, generate a drive voltage value corresponding to the resistance signal, and transmit the drive voltage value to the fan motor of the DC fan so that the fan motor operates according to the drive voltage value.

In certain embodiments, the circuit system further includes the CPU and a parallel data driving circuit, the CPU can generate a piece of serial data according to the control data, and the parallel data generator circuit can receive the serial data outputted by the CPU, transfer the serial data into the digital parallel data, and transmit the transferred digital parallel data to the parallel data driving circuit.

In certain embodiments, the circuit system can drive the DC fan to be rotated at full speed through a maximum drive voltage value derived from the parallel data driving circuit when the circuit system is switched from a power-off state to a power-on state, and the CPU can turn off the fan power converter circuit and stop the DC fan from rotating.

In certain embodiments, the resistance signal generated by the linear voltage-controlled resistor circuit variates linearly and corresponds to the voltage signal based on properties of a field-effect transistor (FET) or a metal-oxide-semiconductor field-effect transistor (MOSFET) in the linear voltage-controlled resistor circuit.

In certain embodiments, the circuit system further includes a fan rotation speed detector that can detect a piece of current rotation speed information of the DC fan and transmit the current rotation speed information of the DC fan to the CPU, and the CPU can receive a piece of temperature information of a working environment of the DC fan, and generate the control data corresponding to the temperature information, so that a rotation speed of the DC fan is regulated according to the drive voltage value generated by the circuit system based on the control data.

In certain embodiments, the trapezoidal resistor network circuit includes a plurality of trapezoidal resistor assemblies, each of the trapezoidal resistor assemblies is an R-2R resistor network, at least one of the trapezoidal resistor assemblies includes three resistors of two different resistance values, respectively being a driver resistor, a jumper resistor, and a divider resistor, one end of the driver resistor is connected to one end of the jumper resistor, another end of the jumper resistor is connected to one end of the divider resistor, and another end of the driver resistor is not connected to another end of the divider resistor.

In certain embodiments, the driver resistor is directly electrically connected to the parallel data driving circuit and has a resistance value twice the resistance value of the jumper resistor, the jumper resistor is connected between the driver resistor and a driver resistor of another trapezoidal resistor assembly, and the divider resistor is connected in parallel to one of driver resistors of the trapezoidal resistor assemblies that has a lowest connection position to the parallel data driving circuit of the circuit system.

In certain embodiments, the circuit system is applicable to a DC fan having a rated voltage ranging from 5 to 12 V.

In certain embodiments, the drive voltage value transmitted by the fan power converter circuit to the DC fan motor ranges from 4.0 to 15.0 V.

In certain embodiments, the drive voltage value transmitted by the fan power converter circuit to the DC fan motor ranges from 10.8 to 13.2 V.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

As may be used herein, the term "substantially" refers to, for example, a value, or an average of values, in an acceptable deviation range of a particular value recognized or decided by a person of ordinary skill in the art, taking into account any specific quantity of errors related to the measurement of the value that may resulted from limitations of a measurement system or device. For example, "substantially" may indicate that the value is within, for example, ±5%, ±3%, ±1%, ±0.5% or ±0.1%, or one or more standard deviations, of the particular value.

Certain aspects of the present disclosure are directed to a circuit system for regulating DC fan rotation speed digitally, which can be applied to a DC fan. In certain embodiments, a circuit system 1 includes a parallel data generator circuit 12, a trapezoidal resistor network circuit 14, a current amplifier circuit 15, a linear voltage-controlled resistor circuit 16, and a fan power converter circuit 17. The parallel data generator circuit 12 is configured to receive a piece of control data outputted from a CPU 11 and generate a corresponding piece of digital parallel data according to the content of the control data. The trapezoidal resistor network circuit 14 is electrically connected to the parallel data generator circuit 12 and is configured to receive the parallel data and transfer the parallel data into a corresponding analog current signal. The current amplifier circuit 15 is electrically connected to the trapezoidal resistor network circuit 14 and is configured to receive the current signal and convert the current signal into a corresponding voltage signal. The linear voltage-controlled resistor circuit 16 is electrically connected to the current amplifier circuit 15 and is configured to receive the voltage signal and generate a corresponding resistance signal according to the voltage signal. The fan power converter circuit 17 is electrically connected to a fan motor 22 of a DC fan. The fan power converter circuit 17 is configured to receive the resistance signal, generate a drive voltage value corresponding to the resistance signal, and transmit the drive voltage value to the fan motor 22 of the DC fan so that the fan motor 22 of the DC fan operates according to the drive voltage value.

Figure 1:
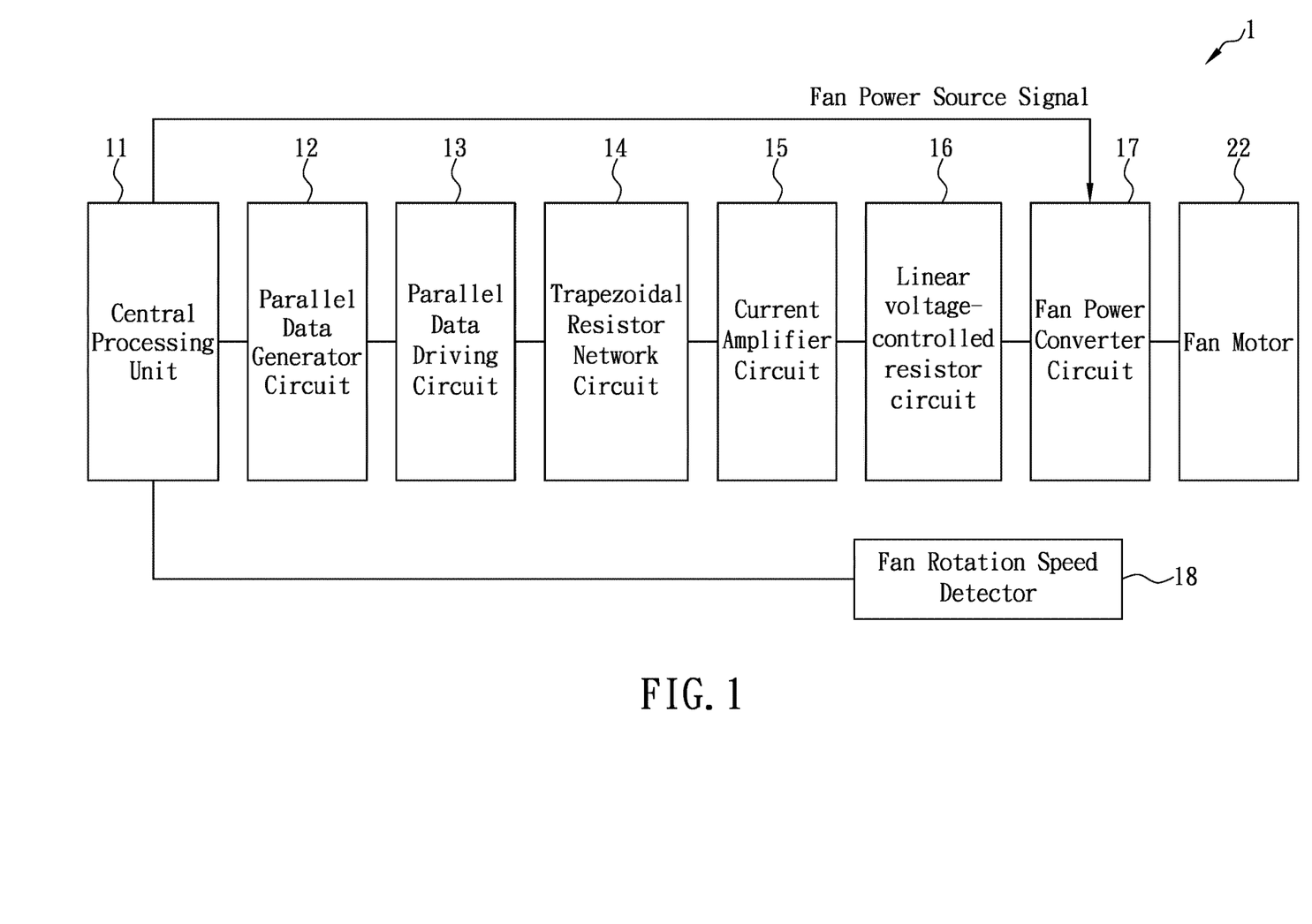
FIG. 1 is a diagram showing the hardware of a circuit system according to certain embodiments of the present disclosure.

In certain embodiments, referring to FIG. 1, a circuit system 1 includes a CPU 11, a parallel data generator circuit 12, a parallel data driving circuit 13, a trapezoidal resistor network circuit 14, a current amplifier circuit 15, a linear voltage-controlled resistor circuit 16, a fan power converter circuit 17, and a fan rotation speed detector 18. The parallel data generator circuit 12 can include a first electrical component U1 (e.g., 74LVC164) and is configured to receive a piece of control data outputted by the CPU 11 and generate a corresponding piece of parallel data according to the content of the control data. The parallel data driving circuit 13 (e.g., an inverting buffer) is electrically connected to the parallel data generator circuit 12 and is configured to receive parallel data and transfer the parallel data into a corresponding piece of inverted parallel data. The parallel data driving circuit 13 can include a second electrical component U2 (e.g., 74HCS240). In certain embodiments, pin 2 (the 1A1 pin) of the second electronic component U2 is connected to pin 13 (the QH pin) of a first electronic component U1; pin 4 (the 1A2 pin) of the second electronic component U2 is connected to pin 12 (the QG pin) of the first electronic component U1; pin 6 (the 1A3 pin) of the second electronic component U2 is connected to pin 11 (the QF pin) of the first electronic component U1; pin 8 (the 1A4 pin) of the second electronic component U2 is connected to pin 10 (the QE pin) of the first electronic component U1; pin 11 (the 2A1 pin) of the second electronic component U2 is connected to pin 6 (the QD pin) of the first electronic component U1; pin 13 (the 2A2 pin) of the second electronic component U2 is connected to pin 5 (the QC pin) of the first electronic component U1; pin 15 (the 2A3 pin) of the second electronic component U2 is connected to pin 4 (the QB pin) of the first electronic component U1; pin 17 (the 2A4 pin) of the second electronic component U2 is connected to pin 3 (the QA pin) of the first electronic component U1; and pin 1 (the 1G pin) of the second electronic component U2 is connected back to pin 19 (the 2G pin) of the second electronic component U2 and is connected to a system ground (GND).

The trapezoidal resistor network circuit 14 includes a plurality of trapezoidal resistor assemblies, each being an R-2R resistor network. In certain embodiments, at least one of the trapezoidal resistor assemblies includes three resistors of two different resistance values (e.g., R and 2R), namely a driver resistor, a jumper resistor, and a divider resistor. One end of the driver resistor is connected to one end of the jumper resistor, another end of the jumper resistor is connected to one end of the divider resistor, and another end of the driver resistor is not connected to another end of the divider resistor. The driver resistor is directly electrically connected to the parallel data driving circuit 13 and has a resistance value (e.g., 2R) twice the resistance value (e.g., R) of the jumper resistor. The jumper resistor is connected between the driver resistor and the driver resistor of another trapezoidal resistor assembly. In certain embodiments, when the driver resistors are arranged in the sequence shown in FIG. 2, the divider resistor can be connected in parallel to the driver resistor having a lowest connection position to the parallel data driving circuit 13 and can have a resistance value of 2R. In certain embodiments, the trapezoidal resistor network circuit 14 includes driver resistors including a first resistor R1, a fourth resistor R4, a third resistor R3, a sixth resistor R6, an eighth resistor R8, a tenth resistor R10, a fourteenth resistor R14 and a thirteenth resistor R13; the trapezoidal resistor network circuit 14 includes jumper resistors including a second resistor R2, a fifth resistor R5, a seventh resistor R7, a ninth resistor R9, an eleventh resistor R11, a twelfth resistor R12 and a fifteenth resistor R15; and the trapezoidal resistor network circuit 14 includes a divider resistor that is a sixteenth resistor R16. Pin 18 (the 1Y1 pin) of the second electronic component U2 is connected to a first end of the first resistor R1. Pin 16 (the 1Y2 pin) of the second electronic component U2 is connected to a first end of the fourth resistor R4. Pin 14 (the 1Y3 pin) of the second electronic component U2 is connected to a first end of the third resistor R3. Pin 12 (the 1Y4 pin) of the second electronic component 12 is connected to a first end of the sixth resistor R6. Pin 9 (the 2Y1 pin) of the second electronic component U2 is connected to a first end of the eighth resistor R8. Pin 7 (the 2Y2 pin) of the second electronic component U2 is connected to a first end of the tenth resistor R10. Pin 5 (the 2Y3 pin) of the second electronic component U2 is connected to a first end of the fourteenth resistor R14. Pin 3 (the 2Y4 pin) of the second electronic component U2 is connected to a first end of the thirteenth resistor R13.

Figure 2:
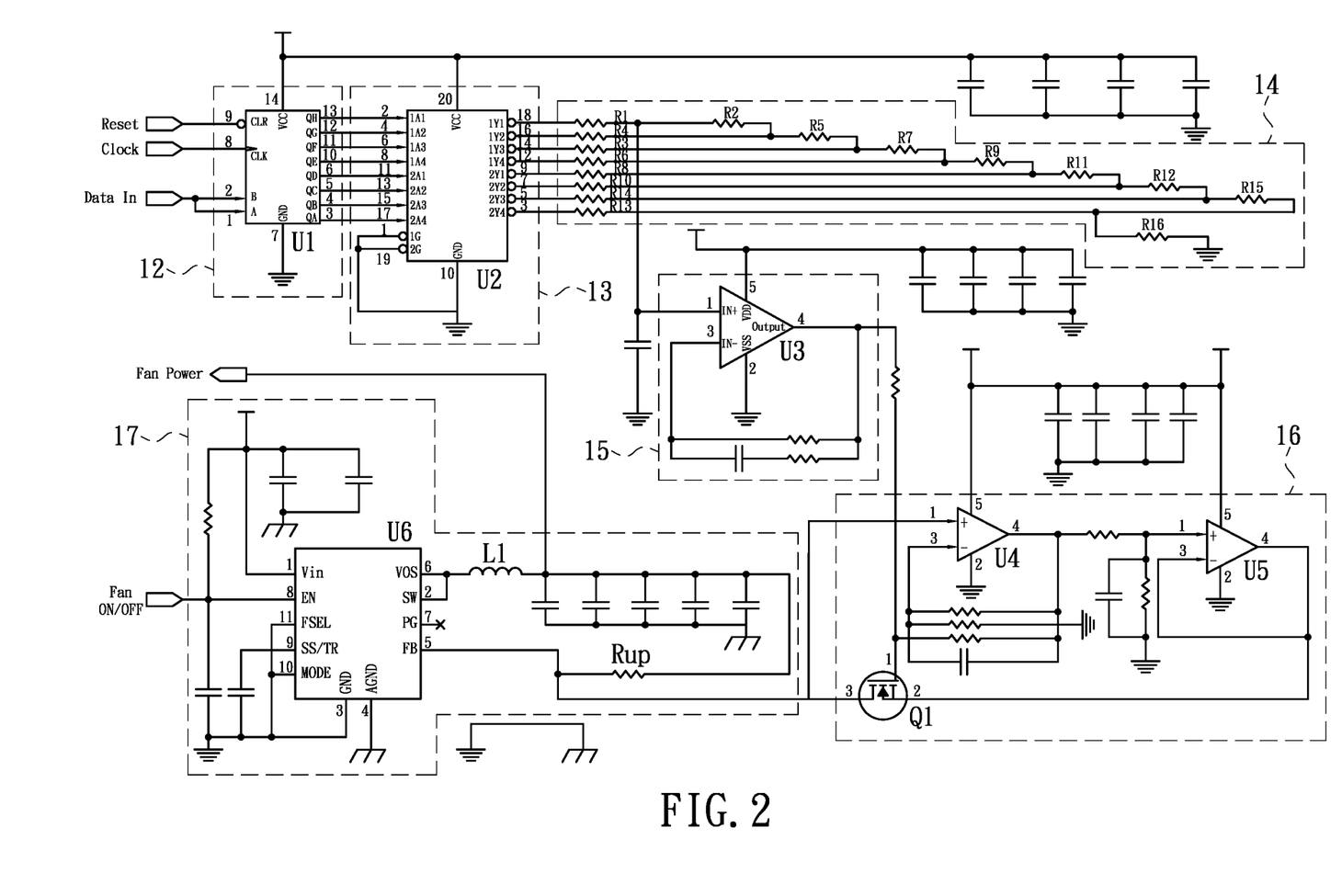
FIG. 2 is a diagram of the circuit of the circuit system according to certain embodiments of the present disclosure.

Further, the fourth resistor R4 is connected in parallel to the first resistor R1 and the second resistor R2. The third resistor R3 is connected in parallel to the fourth resistor R4 and the fifth resistor R5. The sixth resistor R6 is connected in parallel to the third resistor R3 and the seventh resistor R7. The eighth resistor R8 is connected in parallel to the sixth resistor R6 and the ninth resistor R9. The tenth resistor R10 is connected in parallel to the eighth resistor R8 and the eleventh resistor R11. The fourteenth resistor R14 is connected in parallel to the tenth resistor R10 and the twelfth resistor R12. The thirteenth resistor R13 is connected in parallel to the fourteenth resistor R14 and the fifteenth resistor R15. A second end of the first resistor R1 is connected to a first end of the second resistor R2 (i.e., the first resistor R1 and the second resistor R2 are connected in series). A second end of the fourth resistor R4 is connected to a first end of the fifth resistor R5 (i.e., the fourth resistor R4 and the fifth resistor R5 are connected in series). A second end of the third resistor R3 is connected to a first end of the seventh resistor R7 (i.e., the third resistor R3 and the seventh resistor R7 are connected in series). A second end of the sixth resistor R6 is connected to a first end of the ninth resistor R9 (i.e., the sixth resistor R6 and the ninth resistor R9 are connected in series). A second end of the eighth resistor R8 is connected to a first end of the eleventh resistor R11 (i.e., the eighth resistor R8 and the eleventh resistor R11 are connected in series). A second end of the tenth resistor R10 is connected to a first end of the twelfth resistor R12 (i.e., the tenth resistor R10 and the twelfth resistor R12 are connected in series). A second end of the fourteenth resistor R14 is connected to a first end of the fifteenth resistor R15 (i.e., the fourteenth resistor R14 and the fifteenth resistor R15 are connected in series). A second end of the fifteenth resistor R15 is connected back to a second end of the thirteenth resistor R13. The second end of the second resistor R2 is connected between the fourth resistor R4 and the fifth resistor R5. The second end of the fifth resistor R5 is connected between the third resistor R3 and the seventh resistor R7. The second end of the seventh resistor R7 is connected between the sixth resistor R6 and the ninth resistor R9. The second end of the ninth resistor R9 is connected between the eighth resistor R8 and the eleventh resistor R11. The second end of the eleventh resistor R11 is connected between the tenth resistor R10 and the twelfth resistor R12. The second end of the twelfth resistor R12 is connected between the fourteenth resistor R14 and the fifteenth resistor R15. The first end of the sixth resistor R16 is connected between the path of the connected-back second end of the fifteenth resistor R15 and the second end of the thirteenth resistor R13.

The current amplifier circuit 15 is electrically connected to the trapezoidal resistor network circuit 14, and includes a third electronic component U3 (e.g., LM321), at least one capacitor and at least one resistor. The linear voltage-controlled resistor circuit 16 is electrically connected to the current amplifier circuit 15, and includes a fourth electronic component U4 (e.g., LM321), a fifth electronic component U5 (e.g., LM321), a seventh electronic component Q1, at least one capacitor and at least one resistor. The seventh electronic component Q1 can be a FET or a MOSFET. However, the present disclosure is not limited thereto. In certain embodiments, the seventh electronic component Q1 can be a PET that is of another type.

The fan power converter circuit 17 is electrically connected to the linear voltage-controlled resistor circuit 16, and includes a sixth electronic component U6 (e.g., TPS62147), an eighth electronic component LI, an up-side resistor Rup, and at least one capacitor, and has the output resistance value Rout (not shown in the figures) of the linear voltage-controlled resistor circuit 16. The sixth electronic device U6 has built-in overvoltage protection, overcurrent protection, short-circuit protection, and under-voltage protection functions to protect the DC fan and the circuit system 1. The magnitude of the output resistance value Rout is regulated by the seventh electronic component Q1. Accordingly, the up-side resistor Rup and the output resistance value Rout can jointly affect the voltage gain in order to generate a corresponding drive voltage value.

Figure 3A:
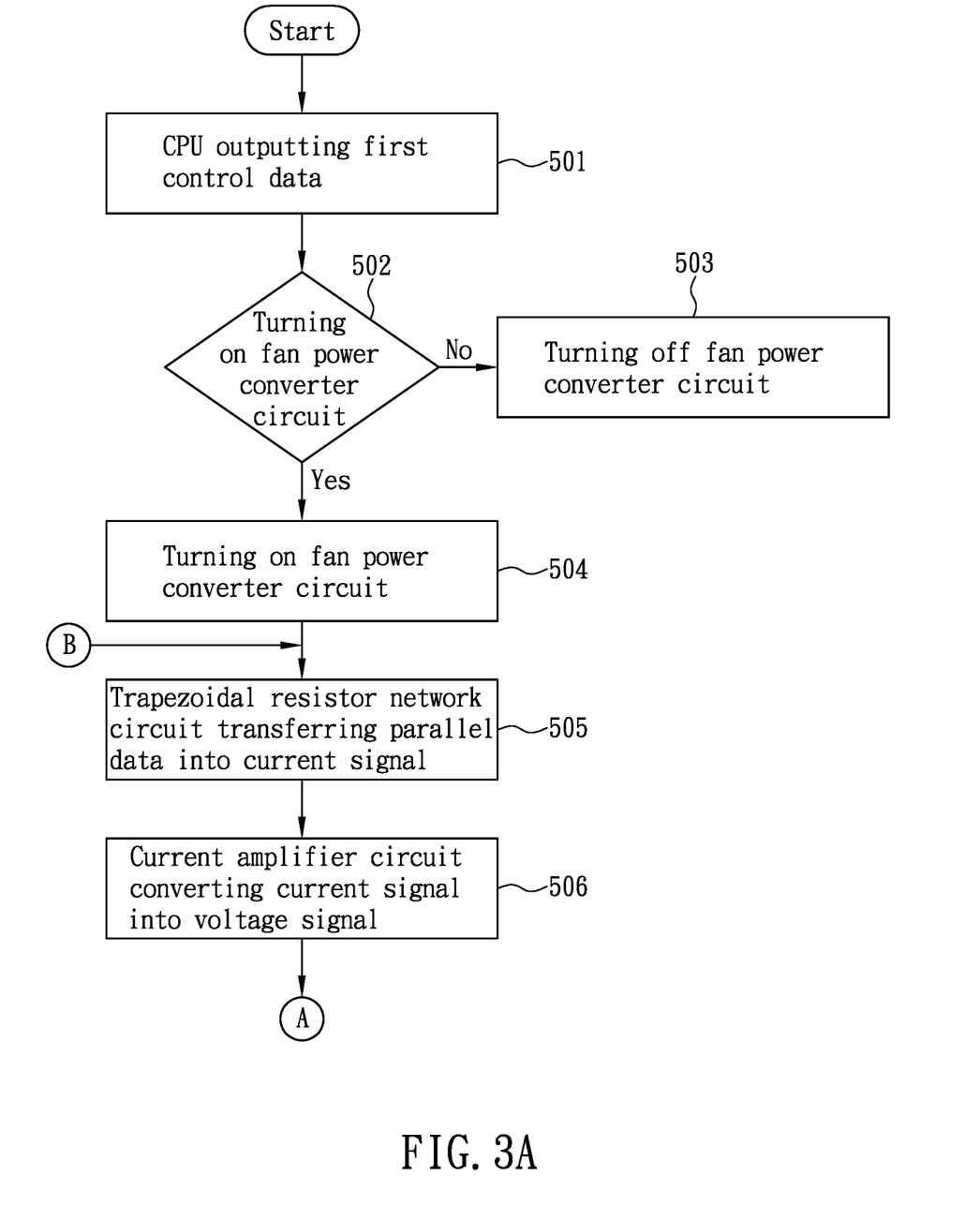
FIG. 3A is a flowchart of the circuit system according to certain embodiments of the present disclosure.
Figure 3B:
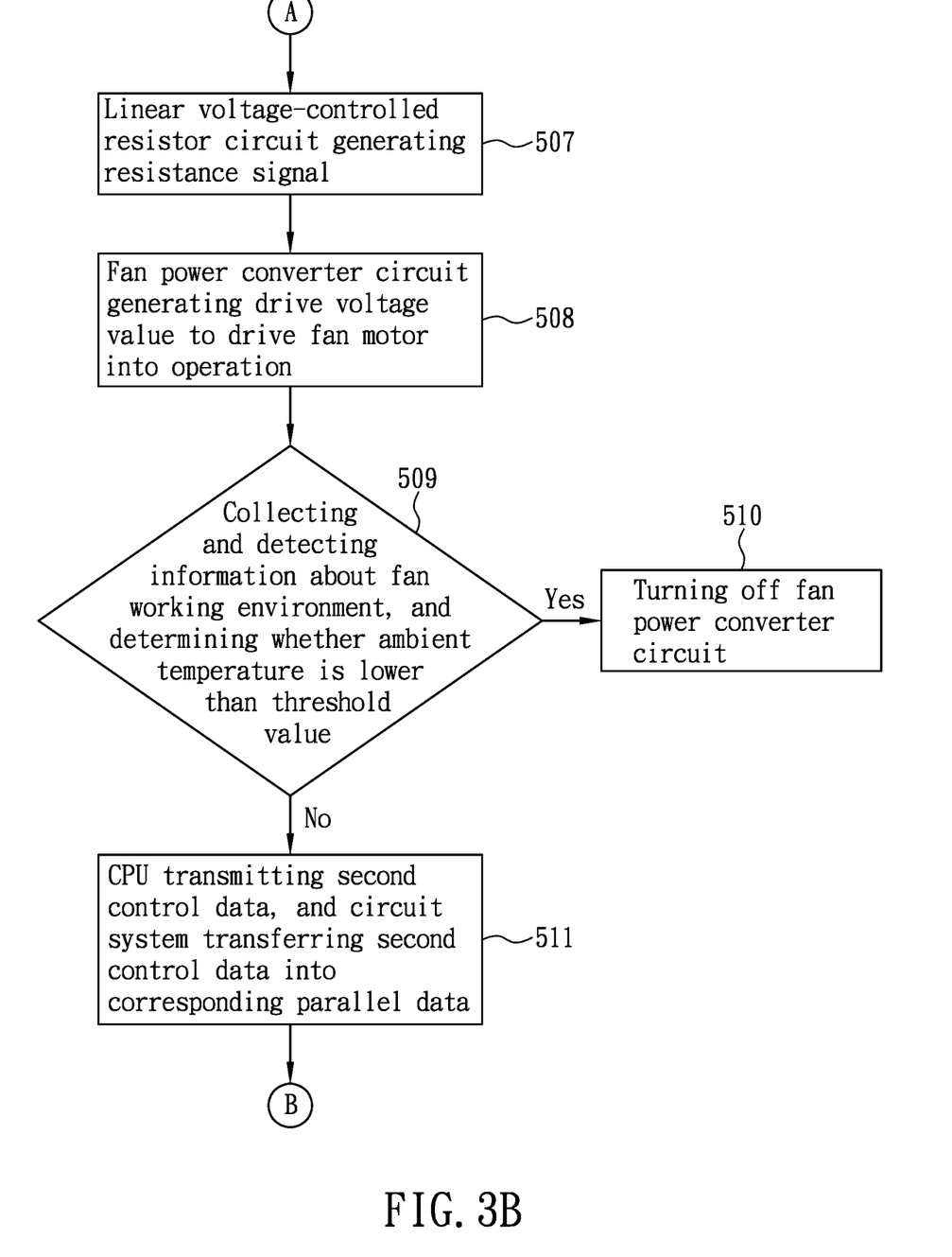
FIG. 3B is a flowchart showing processes from A to B in FIG. 3A of the circuit system according to certain embodiments of the present disclosure.

Referring to FIGS. 2 to 3B, the operating process of the circuit system 1 includes the following steps.

Step 501: The CPU 11 outputting a first piece of control data to the circuit system 1.

In response to a piece of electronic equipment (e.g., a computer or other machine) being switched from a power-off state to a power-on state, the CPU 11 outputs the first piece of control data, which is used to reset the first electronic component U1. The first electronic component U1 receives the first piece of control data (i.e., the resetting information or restoring information) outputted from the CPU 11, outputs a corresponding piece of response data (which can be "00000000") according to the first piece of control data, and transmits the response data to the second electronic component U2. The second electronic component U2 receives the response data outputted from the first electronic component U1 and drives the response data to invert to generate a piece of parallel data (which can be "11111111"), thereby ensuring that the DC fan rotates at the highest speed when the electronic equipment is in the power-on state.

In certain embodiments, the code format of the first piece of control data can include a plurality of data formats (e.g., I2C, SPI, a user-defined format, etc.), and the first electronic component U1 can be a serial-in/parallel-out (SIPO) shift register. However, the present disclosure is not limited thereto, and in certain embodiments the first electronic component U1 and the second electronic component U2 can both be components of the parallel data generator circuit 12.

Step 502: Determining whether to activate or turn off the fan power converter circuit 17.

The fan power converter circuit 17 is turned off (i.e., step 503, in which a fan power source signal indicates turning off) when, for example, the CPU 11 sets a fan power source signal value to, for example, "0". As a result, the DC fan stops rotating, and the circuit system 1 does not and cannot respond to the control data of the rotation speed of the DC fan. The fan power converter circuit 17 is turned on (i.e., step 504, in which a fan power source signal indicates turning on) when, for example, the CPU 11 sets the fan power source signal value, for example, to "1", to ensure that the circuit system 1 can respond to the control data of the rotation speed of the DC fan.

Step 505: The trapezoidal resistor network circuit 14 receiving parallel data and transferring the parallel data into a corresponding analog current signal.

The trapezoidal resistor network circuit 14 receives and transfers the parallel data into a corresponding analog current signal when, for example, the digital parallel data is "11111111". This current signal, obtained by conversion, carries information of a maximum current value.

Step 506: The current amplifier circuit 15 receiving the current signal and converting the current signal into a corresponding voltage signal.

After the trapezoidal resistor network circuit 14 outputs the current signal carrying the information of the maximum current value, the current amplifier circuit 15 receives the current signal and converts the current signal into a corresponding voltage signal. This voltage signal, obtained by conversion, carries information of a maximum control voltage (Vc).

Step 507: The linear voltage-controlled resistor circuit 16 receiving the voltage signal and generating a corresponding resistance signal according to the voltage signal.

After the current amplifier circuit 15 outputs the voltage signal carrying the information of the maximum control voltage, the linear voltage-controlled resistor circuit 16 receives the voltage signal and generates a corresponding resistance signal according to the voltage signal. Given that Current=Voltage/Resistance, a maximum current value and a maximum voltage value correspond to a minimum resistance value. It follows that the resistance signal generated by the linear voltage-controlled resistor circuit 16 carries information of a minimum resistance. The resistance signal according to the present disclosure variates linearly and corresponds to the voltage signal, as it is generated according to the properties of a MOSFET or a FET. Since the linear region of a MOSFET or FET is relatively small, the linear amplifier circuits of the fourth electronic component U4 and of the fifth electronic component U5 are used to increase the linear region by applying the voltage signal carrying the control voltage (Vc) information to the gate of the seventh electronic component Q1, so as to generate a variable resistance region that has a wide range of linear variation, so that the linear voltage-controlled resistor circuit 16 can output a minimum output resistance value Rout to increase the voltage gain. In addition, when using the same MOSFET or FET, the Gate-Source cut-off voltage of the MOSFET or FET is fixed, so the circuit system 1 can regulate the magnitude of the output resistance value Rout by simply regulating the control voltage (Vc), as the magnitude of the output resistance value Rout is inversely proportional to the magnitude of the control voltage (Vc).

Step 508: The fan power converter circuit 17 receiving the resistance signal, generating a drive voltage value corresponding to the resistance signal, and the fan motor 22 of the DC fan operating according to the drive voltage value.

After the linear voltage-controlled resistor circuit 16 outputs the resistance signal carrying the information of a minimum resistance, since a minimum output resistance value Rout can increase the voltage gain, when the sixth electronic device 16 in the fan power converter circuit 17 has a duty cycle of 100%, the fan power converter circuit 17 can regulate full-range variations of the fan's drive voltage value. Accordingly, after the fan power converter circuit 17 that can be a DC-DC conversion circuit receives the resistance signal, the fan power converter circuit 17 generates a maximum drive voltage value corresponding to the minimum output resistance value Rout of the resistance signal, and transmits the drive voltage value to the fan motor 22 of the DC fan, in order for the fan motor 22 of the DC fan to operate according to the drive voltage value. After the fan motor 22 receives the maximum drive voltage value, the DC fan is rotated at full speed according to the maximum drive voltage value, and the initialization of the operation of the DC fan is thereby completed.

Step 509: The CPU 11 processing and the fan rotation speed detector 18 detecting the information of the working environment of the DC fan to determine whether the ambient temperature is below a threshold value.

Once the initialization of the operation of the DC fan is completed, the CPU 11 receives the ambient temperature information collected by a sensor, i.e., the temperature of the working environment of the DC fan (e.g., the temperature of the aforesaid electronic equipment). The sensor is located in the path of the outgoing airflow of the DC fan or is at a position adjacent to the DC fan. In the meantime, the fan rotation speed detector 18 detects the current rotation speed of the DC fan and transmits the detected information through a detection message to the CPU 11. Based on the ambient temperature and the detected information (e.g., a fan rotation speed or other information), the CPU 11 determines whether the fan rotation speed is too high, i.e., whether the fan rotation speed has caused the ambient temperature to go below a threshold value. In response to determining the ambient temperature is lower than the threshold value, the CPU 11 sets a fan power source signal value to, for example, "0", to turn off the fan power converter circuit 17 (i.e., step 510, in which a fan power source signal indicates turning off). Accordingly, the DC fan is stopped from rotating, and the circuit system 1 will, and can, no longer respond to the control data of the rotation speed of the DC fan. In response to determining the ambient temperature is higher than the threshold value, the CPU 11 transmits a second piece of control data (e.g., rotation speed control information) according to the collected environmental information and the detected information to the parallel data generator circuit 12 to be transferred into a corresponding piece of parallel data if the second piece of control data is serial data, or to the parallel data driving circuit 13 of the circuit system (i.e., step 511). If the second piece of control data transmitted by the CPU 11 is serial data, the serial data has to be transferred into parallel data by the parallel data generator circuit 12. If the second control data transmitted by the CPU 11 is parallel data, the parallel data can be transmitted directly to the parallel data driving circuit 13 and be stored therein. As parallel data will use more pins of the CPU 11 than serial data, serial data is currently the major data format. It is noted, however, that both serial data and parallel data can be used with the circuit system 1 disclosed herein.

After the parallel data driving circuit 13 receives the parallel data, the circuit system 1 sequentially adjusts the current signal, the voltage signal, the resistance signal, and the drive voltage value according to the information carried by the parallel data, in order for the DC fan to operate according to the adjusted drive voltage value computed by the circuit system 1. A DC fan that can be applied with the circuit system 1 according to the present disclosure can be one having a rated voltage ranging from 5 to 12 V. and the drive voltage value obtained by computation of the circuit system 1 does not exceed the range of the operating voltage values of such a DC fan. Accordingly, the drive voltage value transmitted by the fan power converter circuit 17 to a DC fan motor can range from 4.0 to 15.0 V. In certain embodiments, a DC fan whose rated voltage is 12 V and whose operating voltage generally ranges from 10.8 to 13.2 V can be used, so the drive voltage value transmitted by the fan power converter circuit 17 to the fan motor 22 of the DC fan can range from 10.8 to 13.2 V. In certain embodiments, a DC fan whose rated voltage is 5 V and whose operating voltage generally ranges from 4.0 to 5.5 V can be used, so the drive voltage value transmitted by the fan power converter circuit 17 to the fan motor 22 of the DC fan can range from 4.0 to 5.5 V.

According to the above, the circuit system 1 disclosed herein greatly increases the fineness of regulation of the speed regulation circuit of a DC fan and enables a low-cost design that has high practical value, provides the advantages of digital speed regulation, and overcomes the inadequacies of the existing step-down regulation circuits, so as to satisfy the use requirements of the industry.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A circuit system for digitally regulating direct-current (DC) fan rotation speed, wherein the circuit system is applicable to a DC fan and comprises:
   a central processing unit (CPU);
   a parallel data generator circuit configured to receive a piece of control data outputted from the CPU and generate a piece of digital parallel data corresponding to the control data;
   a trapezoidal resistor network circuit electrically connected to the parallel data generator circuit and configured to receive the digital parallel data and transfer the digital parallel data into a corresponding analog current signal;
   a current amplifier circuit electrically connected to the trapezoidal resistor network circuit and configured to receive the analog current signal and convert the analog current signal into a voltage signal;
   a linear voltage-controlled resistor circuit electrically connected to the current amplifier circuit and configured to receive the voltage signal and generate a corresponding resistance signal according to the voltage signal, wherein the resistance signal generated by the linear voltage-controlled resistor circuit variates linearly and corresponds to the voltage signal; and
   a fan power converter circuit configured to be electrically connected to a fan motor of the DC fan, receive the resistance signal, generate a drive voltage value corresponding to the resistance signal, and transmit the drive voltage value to the fan motor of the DC fan so that the fan motor operates according to the drive voltage value.

2. The circuit system according to claim 1, further comprising a parallel data driving circuit, wherein the CPU is configured to generate a piece of serial data according to the control data, and the parallel data generator circuit is configured to receive the serial data outputted by the CPU, transfer the serial data into the digital parallel data, and transmit the transferred digital parallel data to the parallel data driving circuit.

3. The circuit system according to claim 2, wherein the circuit system is configured to drive the DC fan to be rotated at full speed through a maximum drive voltage value derived from the parallel data driving circuit when the circuit system is switched from a power-off state to a power-on state; and wherein the CPU is further configured to turn off the fan power converter circuit and stop the DC fan from rotating.

4. The circuit system according to claim 1, wherein the resistance signal generated by the linear voltage-controlled resistor circuit variates linearly and corresponds to the voltage signal based on properties of a field-effect transistor or a metal-oxide-semiconductor field-effect transistor in the linear voltage-controlled resistor circuit.

5. The circuit system according to claim 1, further comprising a fan rotation speed detector configured to detect a piece of current rotation speed information of the DC fan and transmit the current rotation speed information of the DC fan to the CPU, wherein the CPU is configured to receive a piece of temperature information of a working environment of the DC fan, and generate the control data corresponding to the temperature information, so that a rotation speed of the DC fan is regulated according to the drive voltage value generated by the circuit system based on the control data.

6. The circuit according to claim 1, wherein the trapezoidal resistor network circuit comprises a plurality of trapezoidal resistor assemblies, each of the trapezoidal resistor assemblies is an R-2R resistor network, at least one of the trapezoidal resistor assemblies includes three resistors of two different resistance values, respectively being a driver resistor, a jumper resistor, and a divider resistor, one end of the driver resistor is connected to one end of the jumper resistor, another end of the jumper resistor is connected to one end of the divider resistor, and another end of the driver resistor is not connected to another end of the divider resistor.

7. The circuit system according to claim 6, wherein the driver resistor is directly electrically connected to a parallel data driving circuit of the circuit system and has a resistance value twice a resistance value of the jumper resistor, the jumper resistor is connected between the driver resistor and a driver resistor of another trapezoidal resistor assembly, and the divider resistor is connected in parallel to one of driver resistors of the trapezoidal resistor assemblies that has a lowest connection position to the parallel data driving circuit.

8. The circuit system according to claim 1, wherein the circuit system is applicable to a DC fan having a rated voltage ranging from 5 to 12 V.

9. The circuit system according to claim 8, wherein the drive voltage value transmitted by the fan power converter circuit to the DC fan motor ranges from 4.0 to 15.0 V.

10. The circuit system according to claim 8, wherein the drive voltage value transmitted by the fan power converter circuit to the DC fan motor ranges from 10.8 to 13.2 V.

* * * * *